(12) United States Patent
Mano et al.

(10) Patent No.: US 11,873,962 B2
(45) Date of Patent: Jan. 16, 2024

(54) VEHICLE LAMP

(71) Applicant: KOITO MANUFACTURING CO., LTD., Tokyo (JP)

(72) Inventors: Mitsuharu Mano, Shizuoka (JP); Takanori Namba, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 704 days.

(21) Appl. No.: 17/051,479

(22) PCT Filed: Apr. 25, 2019

(86) PCT No.: PCT/JP2019/017641
§ 371 (c)(1),
(2) Date: Oct. 29, 2020

(87) PCT Pub. No.: WO2019/212032
PCT Pub. Date: Nov. 7, 2019

(65) Prior Publication Data
US 2021/0231284 A1 Jul. 29, 2021

(30) Foreign Application Priority Data

May 1, 2018 (JP) .................. 2018-088085
May 1, 2018 (JP) .................. 2018-088086

(51) Int. Cl.
*F21S 41/663* (2018.01)
*F21S 41/143* (2018.01)
(Continued)

(52) U.S. Cl.
CPC .......... *F21S 41/663* (2018.01); *B60Q 1/0023* (2013.01); *B60R 11/04* (2013.01);
(Continued)

(58) Field of Classification Search
None
See application file for complete search history.

(56) References Cited

U.S. PATENT DOCUMENTS

2008/0175017 A1  7/2008  Terada et al.
2011/0193960 A1  8/2011  Endo et al.
(Continued)

FOREIGN PATENT DOCUMENTS

CN  101149136 A  3/2008
CN  105090854 A  11/2015
(Continued)

OTHER PUBLICATIONS

International Search Report issued in corresponding International Application No. PCT/JP2019/017641; dated Jun. 18, 2019 (1 page).
(Continued)

*Primary Examiner* — Bao-Luan Q Le
*Assistant Examiner* — Danell L Owens
(74) *Attorney, Agent, or Firm* — Osha Bergman Watanabe & Burton LLP

(57) ABSTRACT

A lamp unit and a camera are disposed in a lamp housing including a translucent cover, and an aiming adjustment of the camera is enabled. The camera is provided with a lens hood for preventing light emitted from the lamp unit from being incident on the camera. The lens hood has a required gap with respect to the translucent cover and allows the camera to tilt.

16 Claims, 13 Drawing Sheets

(51) Int. Cl.
  *B60Q 1/00* (2006.01)
  *B60R 11/04* (2006.01)
  *H04N 23/57* (2023.01)
  *H04N 23/695* (2023.01)
  *F21Y 115/10* (2016.01)
  *F21S 41/255* (2018.01)
  *B60Q 1/14* (2006.01)

(52) U.S. Cl.
  CPC ............ *F21S 41/143* (2018.01); *H04N 23/57* (2023.01); *H04N 23/695* (2023.01); *B60Q 1/143* (2013.01); *F21S 41/255* (2018.01); *F21Y 2115/10* (2016.08)

(56) References Cited

U.S. PATENT DOCUMENTS

| | | | |
|---|---|---|---|
| 2015/0323148 A1 | 11/2015 | Tsuda | |
| 2018/0170240 A1* | 6/2018 | Wama | B60Q 1/0023 |

FOREIGN PATENT DOCUMENTS

| | | |
|---|---|---|
| EP | 2626243 A1 | 8/2013 |
| JP | 2008105518 A | 5/2008 |
| JP | 2010260379 A | 11/2010 |
| JP | 2013147138 A | 8/2013 |
| JP | 2013164913 A | 8/2013 |
| KR | 20140001268 A | 1/2014 |
| WO | 2013099144 A1 | 7/2013 |

OTHER PUBLICATIONS

Written Opinion of the International Searching Authority issued in corresponding International Application No. PCT/JP2019/017641; dated Jun. 18, 2019 (6 pages).

Chinese Office Action issued in corresponding Chinese Application No. 201980027973.5, dated Nov. 25, 2021 (15 pages).

* cited by examiner

VEHICLE LAMP

TECHNICAL FIELD

The present disclosure relates to a vehicle lamp, particularly to a vehicle lamp where an imaging device is disposed in a lamp housing.

BACKGROUND ART

In vehicles such as an automobile, a camera (imaging device) is disposed in the automobile in order to realize automatic driving control and automatic light distribution control of headlamps. It has been proposed that the camera images a front region of the automobile and analyzes an image obtained by imaging to detect another vehicle such as an oncoming vehicle or a preceding vehicle present in the front region. For example, adaptive driving beam (ADB) light distribution control has been proposed as a technique for controlling light distribution of the headlamps of the automobile. The ADB light distribution control is a technique for controlling a part of a high beam light distribution pattern of the headlamp so as not to dazzle the other vehicle such as an oncoming vehicle or a preceding vehicle detected from the image imaged by the camera.

In order to realize highly accurate ADB light distribution control in this technique, Patent Literature 1 proposes a technique in which a camera is disposed in a lamp housing of a headlamp. In this technology, since a camera optical axis is close to a lamp optical axis, a direction of another vehicle detected from an image imaged by the camera, that is, an angle when the other vehicle is viewed from an own vehicle matches or substantially matches an angle of light emitted from the headlamp. Therefore, the ADB light distribution control in the headlamp can be performed easily and with high accuracy.

When the camera is disposed in the lamp housing, part of light emitted from a lamp unit disposed in the same lamp housing is incident on a lens barrel of the camera directly or after being reflected by a translucent cover, and whiteout due to halation and the like easily occurs in the image imaged by the camera. Therefore, Patent Literature 2 discloses a technique in which a part of an extension disposed in a lamp surrounds a camera to form a hood portion, and the hood portion prevents light emitted from a lamp unit from being incident on the camera.

Further, light emitted from a headlamp of an oncoming vehicle passes through a translucent cover and is incident on a lamp housing, and the incident light may be incident on the camera. Therefore, whiteout due to halation and the like easily occurs in the image imaged by the camera. Patent Literature 2 discloses a technique in which a reflected light reducing portion is formed in a part of the extension which is disposed in the lamp and functions as a pseudo reflector, and the light incident on the camera from the lamp unit is reduced by the reflected light reducing portion.

CITATION LIST

Patent Literature

Patent Literature 1: JP2013-147138A
Patent Literature 2: JP2013-164913A

SUMMARY OF INVENTION

Problem to be Solved

In the technique of Patent Literature 2, since there is a gap between the hood portion and the translucent cover, a part of the light emitted from the lamp unit may enter an inside of the hood portion through the gap and be incident on the camera. Further, when the light emitted from the lamp unit passes through the translucent cover of the lamp housing, the part of the light may be guided inside the translucent cover to a position facing the hood portion and may be incident on the camera from an inner surface of the translucent cover.

Further, although the technique of Patent Literature 2 is effective in preventing the light emitted from the lamp unit from being incident on the camera, it is not clear whether an effect of preventing the light incident into the lamp after passing through the translucent cover from the outside from being incident on the camera is obtained. Further, in the technique of Patent Literature 2, in order to constitute the reflected light reducing portion, a coating material which reduces light reflectance is applied to a partial region of a surface of the extension. Therefore, the work of forming the reflected light reducing portion is required.

An object of the present disclosure is to provide a vehicle lamp capable of preventing light which is emitted from a lamp unit from being incident on an imaging device and capable of increasing a degree of freedom in aiming adjustment of the imaging device.

An object of the present disclosure is to provide a vehicle lamp capable of preventing light incident into the vehicle lamp after passing through the translucent cover from the outside from being incident on an imaging device and capable of enhancing design in appearance.

Means for Solving the Problem

A vehicle lamp according to an aspect of the present disclosure includes:
  a lamp unit disposed in a lamp housing including a translucent cover;
  an imaging device disposed in the lamp housing and configured to be tiltable; and
  a light control unit provided on at least one of the translucent cover and the imaging device, and configured to prevent light emitted from the lamp unit from being incident on the imaging device,
  wherein the light control unit is configured to allow the imaging device to tilt.

The light control unit is a light-shielding lens hood provided at the imaging device, and the lens hood is configured not to interfere with the translucent cover when the imaging device is tilted. In this case, the light control unit may include a fixed cover which is provided on the translucent cover and overlaps the lens hood. Further, the lens hood may be a flexible light-shielding lens.

Alternatively, the light control unit may be configured as a light emitting portion which is provided at a peripheral portion of an imaging region of the translucent cover facing the imaging device and is configured to emit light guided through the translucent cover toward an outer side of the imaging region, and the imaging device may be disposed on an inner side of the light emitting portion in a state where a gap allowing the imaging device to tilt with respect to the peripheral portion is ensured.

A vehicle lamp according to another aspect of the present disclosure includes:
  an imaging device disposed in a lamp housing which includes a translucent cover and configured to perform imaging through the translucent cover; and an extension disposed in the lamp housing, configured to cover the imaging device, and having a surface facing an inner surface of the translucent cover configured as a light reflecting surface, wherein the extension includes, in a partial region of the light reflecting surface, a surface region forming a gap having a cross-sectional shape a dimension of which between the light reflecting surface and the inner surface of the translucent cover gradually increases as being away from the imaging device in at least one of a horizontal cross section and a vertical cross section. The surface region may be disposed in a vertical direction of the imaging device.

As an aspect of the present disclosure, the imaging device is tiltable with respect to the lamp housing, the extension includes a fixed extension supported by the lamp housing and a movable extension supported by the imaging device. The movable extension is formed as a conical surface centered on an imaging window provided at the fixed extension, and the conical surface is configured as the surface region.

As another aspect of the present disclosure, the extension is a fixed extension supported by the lamp housing, a part thereof is formed as a tilt surface tilted in at least one direction from the imaging window, and the tilt surface is configured as the surface region.

Effects

According to the present disclosure, the light control unit can prevent direct light emitted from the lamp unit or light guided by the translucent cover from being incident on the imaging device, and occurrence of whiteout in the imaging device can be prevented. On the other hand, since the light control unit allows the imaging device to tilt with respect to the translucent cover, a degree of freedom in aiming adjustment in the imaging device can be increased. Accordingly, it is possible to realize suitable light distribution control of the lamp unit using the imaging device.

According to the present disclosure, the light incident from the outside into the lamp is reflected in the gap between the surface region of the extension configured as the light reflecting surface and the translucent cover, and is directed in a direction away from the imaging device, and thus the light is prevented from being incident on the image device. Accordingly, the whiteout in the imaging device is prevented and design in appearance of the lamp is improved.

DETAILED DESCRIPTION OF EMBODIMENTS

Hereinafter, embodiments of the present disclosure will be described with reference to the drawings.

First Embodiment

Figure 1:
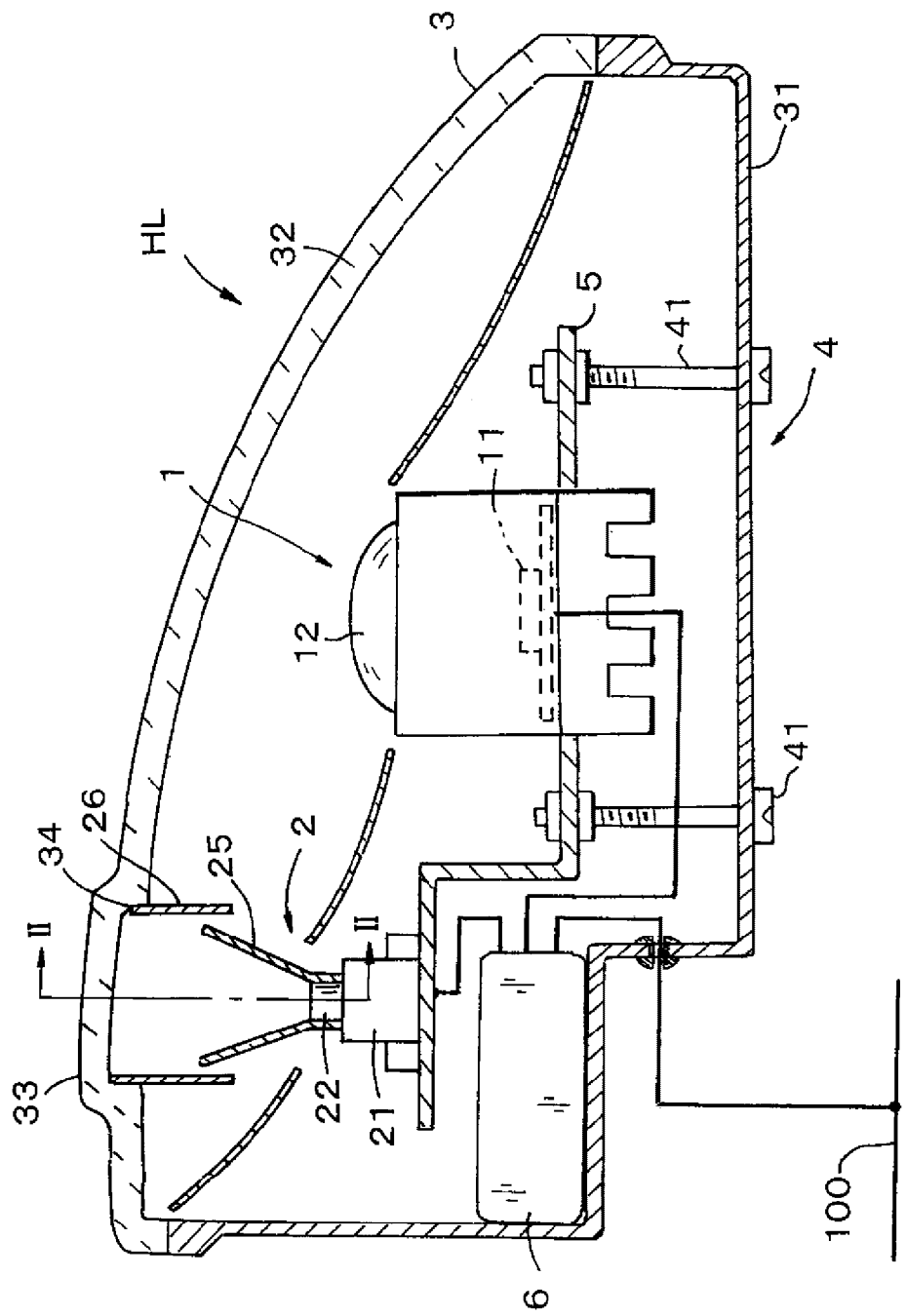
FIG. 1 is a horizontal cross-sectional view of a headlamp according to a first embodiment of the present disclosure.

In the first embodiment, a case will be described in which a vehicle lamp according to the present disclosure is applied to a right headlamp of the left and right headlamps mounted on left and right sides of a front portion of a vehicle body of an automobile. FIG. 1 is a horizontal cross-sectional view of a right headlamp HL. The left headlamp has the same configuration except that the left and right headlamps are symmetrical. In the following description, a front-rear direction and a left-right direction mean front, rear, left and right based on the automobile and the headlamps.

The right headlamp HL includes a lamp unit 1 capable of controlling an ADB and a camera 2. The camera 2 is an example of an imaging device. The lamp unit 1 and the camera 2 are disposed in a lamp housing 3. In the present embodiment, the lamp unit 1 is disposed at an outer position in a vehicle width direction in the lamp housing 3, and the camera 2 is disposed on an inner side thereof.

The lamp housing 3 includes a lamp body 31 having a container shape in which a front surface region is opened, and a translucent cover 32 fixed so as to cover the opening of the lamp body 31. Light emitted from the lamp unit 1 passes through the translucent cover 32 and is radiated onto a front region of the automobile. The camera 2 is configured to be capable of imaging a front region of the automobile through the translucent cover 32.

A base plate 5 supported by an aiming mechanism 4 by the lamp body 31 is disposed in the lamp housing 3. The lamp unit 1 and the camera 2 are supported by the base plate 5. The aiming mechanism 4 includes aiming screws 41. By manually or automatically adjusting the aiming screws 41, the base plate 5 is tilted in an upper-lower direction and the left-right direction. By tilting the base plate 5 up and down, it is possible to adjust the angles of the optical axes of the lamp unit 1 and the camera 2. Since the aiming mechanism 4 including such aiming screws 41 is known, a detailed description thereof will be omitted.

Although not described in detail, the lamp unit 1 is configured as a projector-type lamp unit including a plurality of light emitting diodes (LEDs) 11 and a projection lens 12. Light emitted by the LEDs 11 is projected to a front of the automobile by the projection lens 12 to illuminate the front of the automobile. The lamp unit 1 is configured to form an arbitrary light distribution pattern including a high beam light distribution and a low beam light distribution and to be capable of performing an ADB light distribution control by selecting the plurality of LEDs 11 and causing the plurality of LEDs 11 to emit light so as to control light distribution thereof.

In the present embodiment, the camera 2 is constituted by a digital camera, and a lens barrel 22 is integrally provided on a front surface of the camera body 21. The camera 2 is capable of imaging, through the translucent cover 32, an image of the front region of the automobile, particularly a vehicle such as a preceding vehicle or an oncoming vehicle present in the front region.

A lamp electronic control unit (ECU) 6 connected to a controller region network (CAN) 100 is disposed in the lamp housing 3. The lamp ECU 6 is electrically connected to the lamp unit 1 and the camera 2. The lamp ECU 6 performs the ADB light distribution control by controlling a lighting state of the lamp unit 1, that is, the light emission of the LEDs 11, based on an image obtained by imaging by the camera 2.

Figure 2:
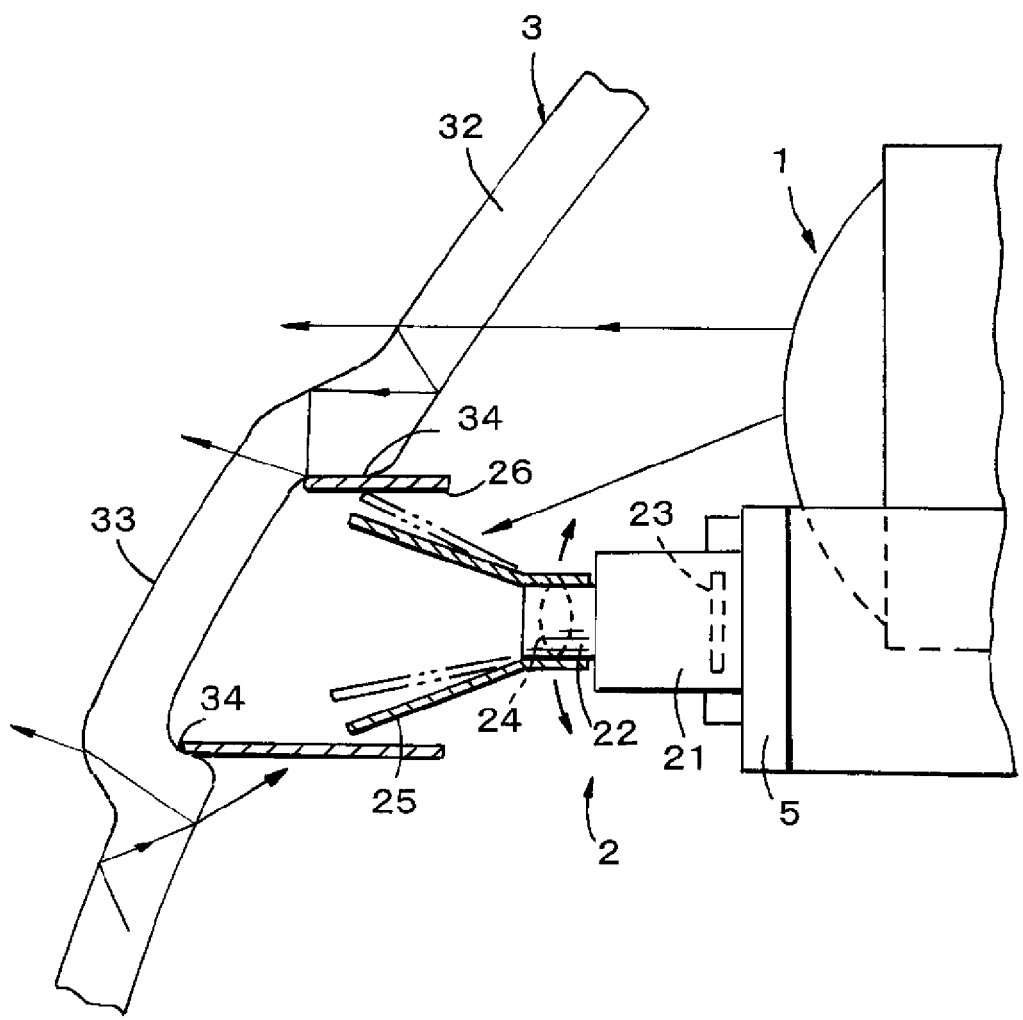
FIG. 2 is an enlarged vertical cross-sectional view taken along a line II-II in FIG. 1.
Figure 3:
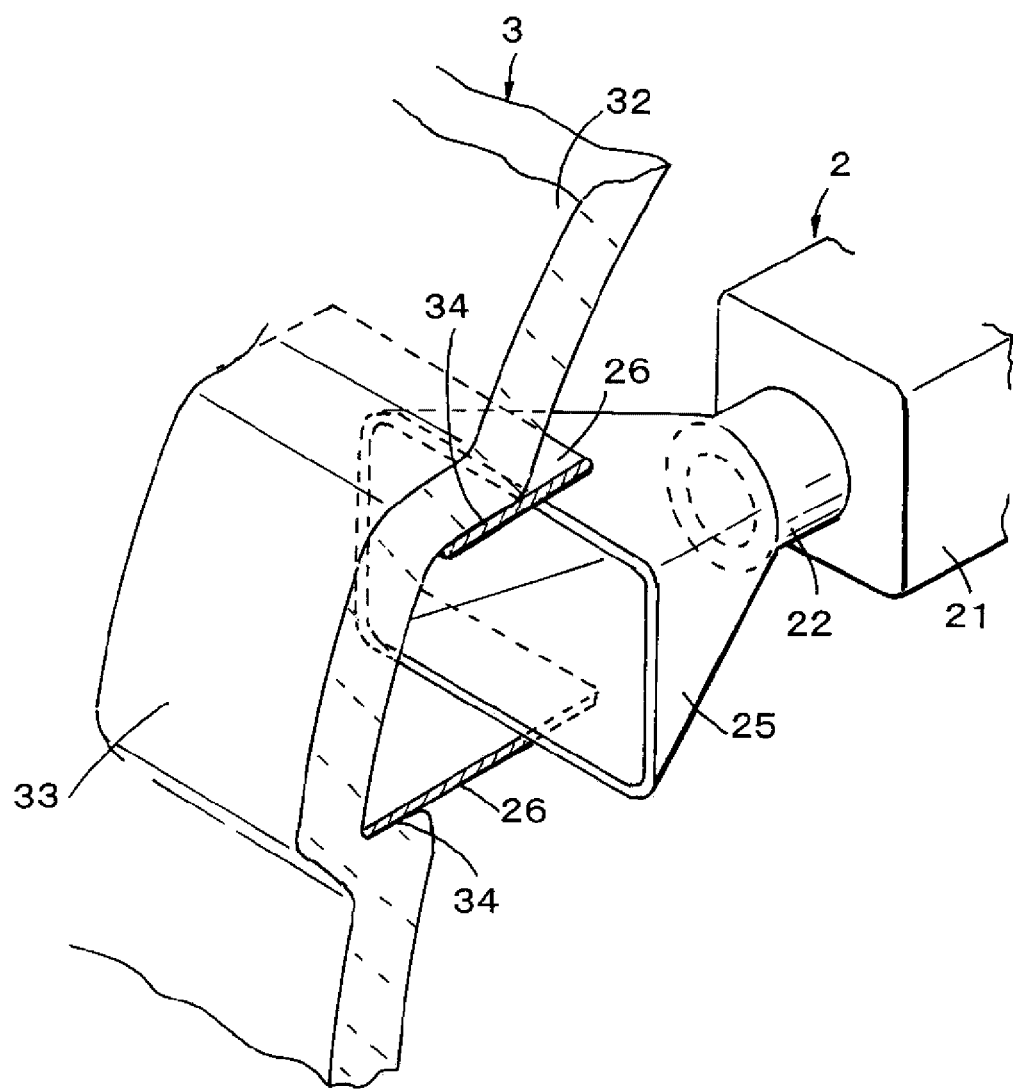
FIG. 3 is a perspective view in which a part of a camera vicinity region is broken.

FIG. 2 is an enlarged vertical cross-sectional view taken along a line II-II in FIG. 1, and FIG. 3 is a perspective view in which a part of a region including the camera 2 and the translucent cover 32 is broken. In the camera 2, an imaging element 23 including a CCD or a CMOS is installed in the camera body 21. Further, an imaging lens 24 is installed in the lens barrel 22. It is possible to perform imaging by forming an image of a vehicle to be imaged on the imaging element 23 by the imaging lens 24.

A lens hood 25 made of a light shielding member having a quadrangular pyramid shape is attached to the lens barrel 22 of the camera 2. Since the lens hood 25 is configured in a shape capable of ensuring an imaging angle of view of the camera 2 in a predetermined imaging range, the camera 2 can image the front region of the automobile through the translucent cover 32.

A region 33 facing a front end opening of the lens hood 25 of the translucent cover 32 is configured as an imaging region 33 when imaging is performed by the camera 2. The imaging region 33 protrudes somewhat forward from other regions of the translucent cover 32. In the present embodiment, the imaging region 33 is formed in a rectangular shape when viewed from a front direction of the headlamp 1. The imaging region 33 is formed in a longitudinal-lateral dimension somewhat larger than a front end opening dimension of the lens hood 25. Further, the imaging region 33 protrudes forward from the other regions of the translucent cover 32 by a step portion 34 provided on a peripheral edge of the imaging region 33. In the present embodiment, a protruding dimension of the step portion 34 is set to be equal to or substantially larger than a thickness dimension of the translucent cover 32.

The imaging region 33 is formed in a uniform thickness with a smooth surface such that light incident on the camera 2 during imaging is not refracted in random directions. A fixed hood 26 protruding rearward of the lamp is attached to an inner surface of the step portion 34 over an entire circumference. The fixed hood 26 is formed of a light shielding member, and is formed in a rectangular tube shape having a longitudinal-lateral dimension larger than the front end opening of the lens hood 25. A tip end region of the fixed hood 26 in a protruding direction is disposed so as to surround an outer periphery of the front end opening of the lens hood 25. A gap of a required dimension is ensured between the tip end region of the fixed hood 26 in the protruding direction and the front end opening of the lens hood 25 in an overlapping direction, that is, in a direction along the surface of the translucent cover 32.

In the first embodiment, the lens hood 25 and the fixed hood 26 are configured as an light control unit for shielding the light emitted from the lamp unit 1 and preventing the light from being incident on the camera 2. As illustrated in FIG. 2, a part of the light emitted from the lamp unit 1 is emitted toward the camera 2. Further, the other part of the light emitted from the lamp unit 1 is incident on the translucent cover 32 from a rear surface of the translucent cover 32. The light incident on the translucent cover 32 passes through the translucent cover 32 and is emitted forward. The part of the light incident on the translucent cover 32 is reflected by each inner surface of a front surface and a rear surface of the translucent cover 32, and travels toward the imaging region 33 while being guided inside the translucent cover 32.

The light emitted toward the camera 2 is shielded by the lens hood 25 or the fixed hood 26, and is prevented from being incident on the lens barrel 22 of the camera 2. When the light guided in the translucent cover 32 is reflected on the inner surface of the front surface or the rear surface, a part of light emitted from the translucent cover 32, in particular, light emitted from the rear surface is directed to the camera 2. Since the light is shielded by the fixed hood 26 or the lens hood 25, the light is prevented from being incident on the lens barrel 22.

The other part of the light guided through the translucent cover 32 is reflected on the inner surface of the step portion 34 located immediately in front of the imaging region 33. Alternatively, the light is reflected by the fixed hood 26 provided on the step portion 34. These reflected lights are emitted forward of the translucent cover 32. Accordingly, the light emitted from the lamp unit 1 is prevented from being incident on the lens barrel 22, and the occurrence of white out in the camera 2 can be prevented. The same applies to the light guided so as to go around a lower side of the imaging region 33 in the translucent cover 32. That is, the light guided downward from the imaging region 33 in FIG. 2 is also reflected by the fixed hood 26.

When the base plate 5 is tilted by operating the aiming screws 41 and the aiming adjustment of the lamp unit 1 and the camera 2 is performed, the lens hood 25 is tilted integrally with the camera 2 as illustrated by a two-dot chain line in FIG. 2. At this time, the lens hood 25 and the fixed hood 26 do not interfere with each other by the gap therebetween, the camera 2 can be tilted, and the aiming can be performed.

Figure 4:
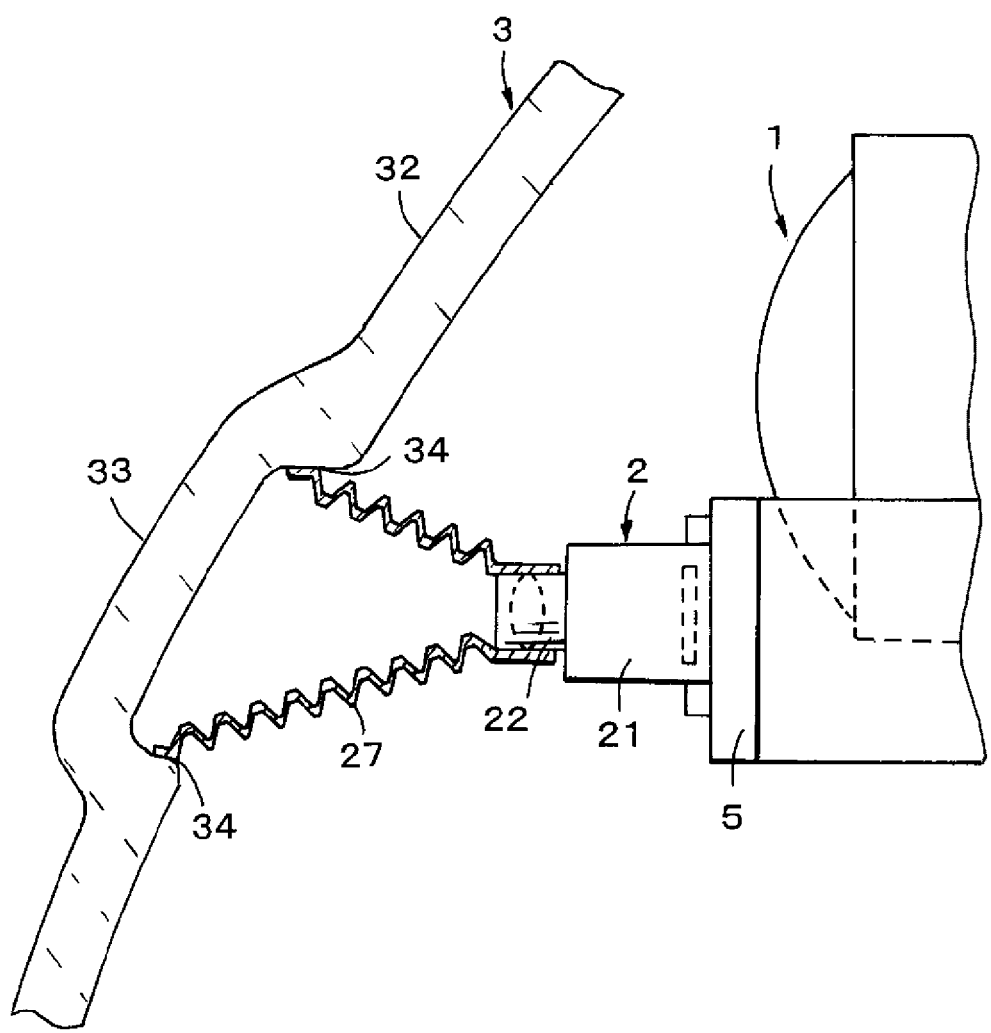
FIG. 4 is a vertical cross-sectional view of a main part of a headlamp according to a modification of the first embodiment.

In the first embodiment, as illustrated in the vertical cross-sectional view of FIG. 4, a portion corresponding to the lens hood 25 of the first embodiment and a portion corresponding to the fixed hood 26 may be configured as a bellows 27. The bellows 27 is a bellows-shaped hood integrally formed of a flexible light shielding member. A front end portion of the bellows 27 is fixed to the step portion 34 of the translucent cover 32, and a rear end portion thereof is fixed to the lens barrel 22.

In this modification, the bellows 27 is configured as the light control unit. Since the lens barrel 22 is reliably shielded by the bellows 27 between the lens barrel 22 and the translucent cover 32, the direct light emitted from the lamp unit 1 and the light emitted from the translucent cover 32 are prevented from being incident on the lens barrel 22. Further, at the time of aiming adjustment, the camera 2 can be tilted by deformation in the upper-lower direction and the left-right direction of the bellows 27.

Second Embodiment

Figure 5:
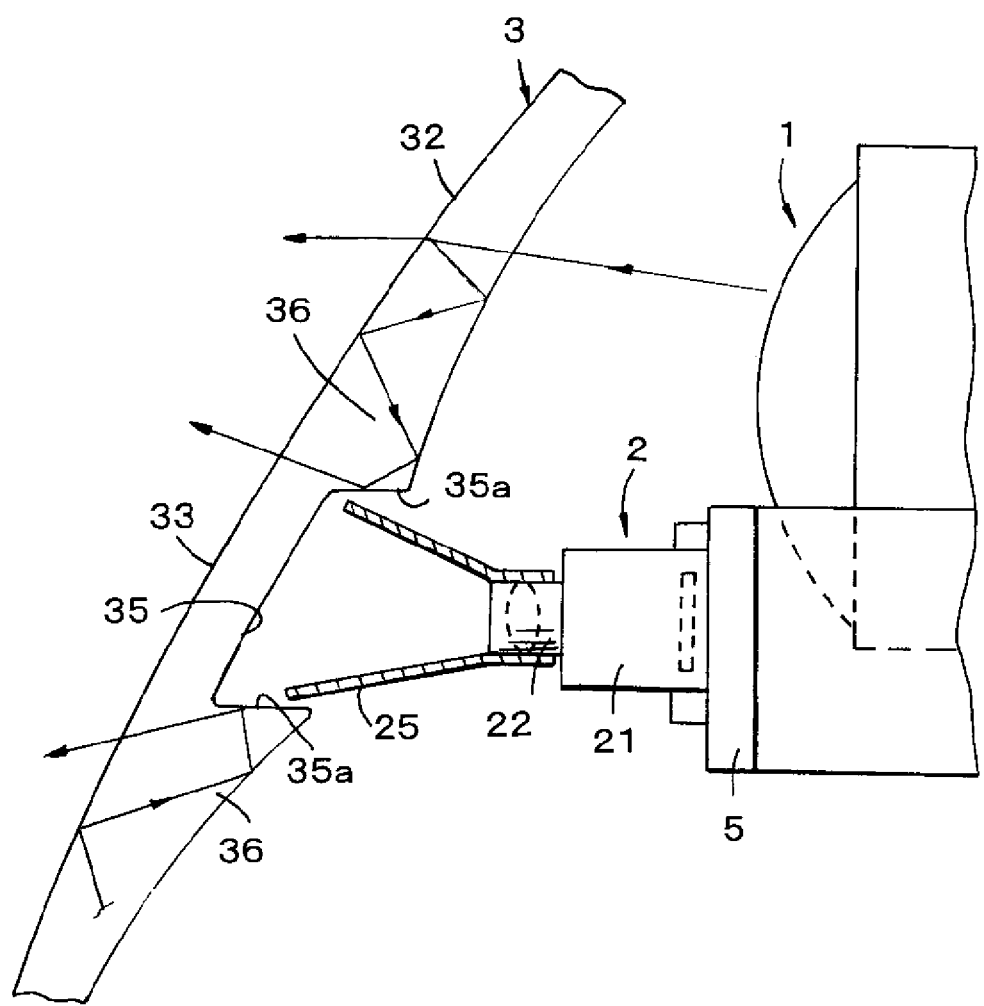
FIG. 5 is a vertical cross-sectional view of a main part of a headlamp according to a second embodiment of the present disclosure.

A vehicle lamp according to a second embodiment is applied to the headlamp as in the first embodiment. FIG. 5 is a vertical cross-sectional view of a main part of the headlamp 1 according to the second embodiment. Incidentally, in the description of the second embodiment, description of members having the same reference numerals as those already described in the description of the first embodiment will be omitted for convenience of description. The translucent cover 32 includes a light emitting portion 36 formed around the imaging region 33. The light emitting portion 36 has a tapered cross-sectional shape whose thickness dimension is gradually increased toward the imaging region 33. Further, the translucent cover 32 is formed with a recessed portion 35 in which a rear surface of the imaging region 33 is recessed forward. A peripheral side surface 35a of the recessed portion 35 is formed as a surface along an optical axis direction.

The camera 2 is provided with the lens hood 25 similar to that of the first embodiment. The front end opening of the lens hood 25 is disposed in the recessed portion 35 of the imaging region 33. The front end opening of the lens hood 25 is disposed between the peripheral side surface 35a of the recessed portion 35 with a predetermined gap along a surface direction of the translucent cover 32.

In the second embodiment, the light emitting portion 36 and the lens hood 25 are configured as the light control unit. The direct light emitted from the lamp unit 1 is prevented from being incident on the lens barrel 22 by the lens hood 25 as in the first embodiment. The light incident on the translucent cover 32 is guided inside the translucent cover 32 and travels to the imaging region 33. Since the light emitting portion 36 has a tapered shape, an incident angle and a reflection angle gradually increase when the light guided through the translucent cover 32 is reflected on the front surface and the rear surface of the translucent cover 32. In particular, it becomes difficult for the light to be emitted rearward from the rear surface of the translucent cover 32. The light traveling inside the translucent cover 32 is finally reflected forward by the peripheral side surface 35a of the recessed portion 35, and is emitted from the front surface of the translucent cover.

Therefore, the light guided through the translucent cover 32 is not incident on the inside of the lens hood 25 from the recessed portion 35 and is not incident on the lens barrel 22. Accordingly, it is possible to prevent the occurrence of white out in the camera 2. The same applies to the light guided so as to go around a lower side region of the recessed portion 35 in the translucent cover 32. That is, the light guided downward from the recessed portion 35 in FIG. 5 is also reflected forward by the peripheral side surface 35a of the recessed portion 35.

When operating the aiming screws 41 to perform aiming adjustment, by the gap ensured between the lens hood 25 and the peripheral side surface 35a of the recessed portion 35, the lens hood 25 does not interfere with the translucent cover 32, and the camera can be tilted.

Figure 6:
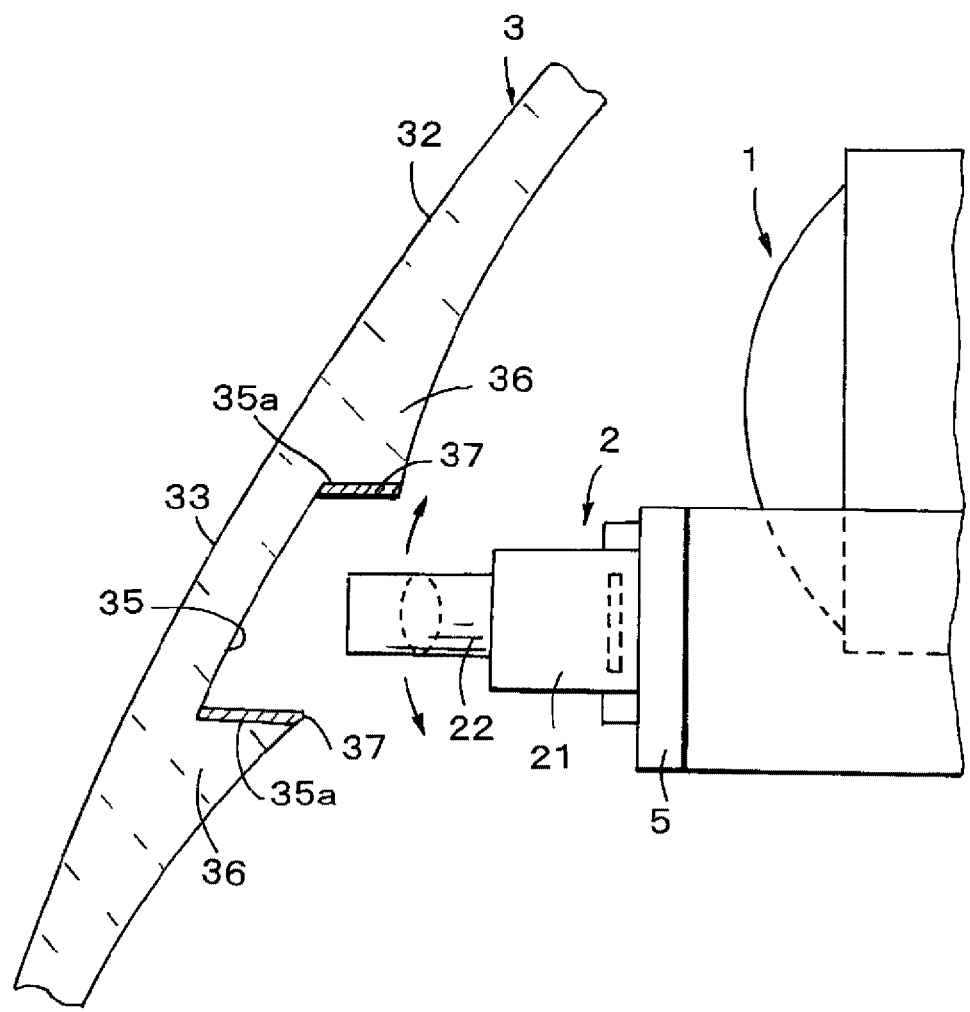
FIG. 6 is a vertical cross-sectional view of a main part of a headlamp according to a modification of the second embodiment.

In the second embodiment, as illustrated in FIG. 6, in a case where the length of the lens barrel 22 is longer than the depth of the recessed portion 35 (a dimension in the front-rear direction) to a certain degree, a front end portion of the lens barrel 22 may be inserted into the recessed portion 35 without the provision of the lens hood 25. Alternatively, although not illustrated, a front end opening of the lens barrel 22 may be inserted into the recessed portion 35 even in a case where the camera 2 is disposed close to the translucent cover 32. Even in this case, a required gap is ensured between the lens barrel 22 and the peripheral side surface 35a of the recessed portion 35 along the surface direction of the translucent cover 32.

In this modification, the light emitting portion 36 constitutes the light control unit. That is, by a light emitting action of the light emitting portion 36 provided around the imaging region 33 of the translucent cover 32, since the light guided through the translucent cover 32 is prevented from being emitted toward the inside of the recessed portion 35, it is possible to prevent the light from being incident on the lens barrel 22. Further, since the interference between the lens barrel 22 and the translucent cover 32 can be prevented during the aiming adjustment, the camera 2 can be tilted. This modification is effective in that the lens hood is unnecessary.

Further, in the second embodiment, as illustrated in FIG. 6, a reflecting film, for example, a light reflecting film 37 coated with aluminum may be formed on the peripheral side surface 35a of the recessed portion 35 of the translucent cover 32. The light guided through the translucent cover 32 can be reflected by the light reflecting film 37 and reliably emitted from the translucent cover 32, so that the incidence of the light on the lens barrel 22 can be prevented. In this modification, the light emitting portion 36 and the light reflecting film 37 constitute the light control unit.

Third Embodiment

Figure 7:
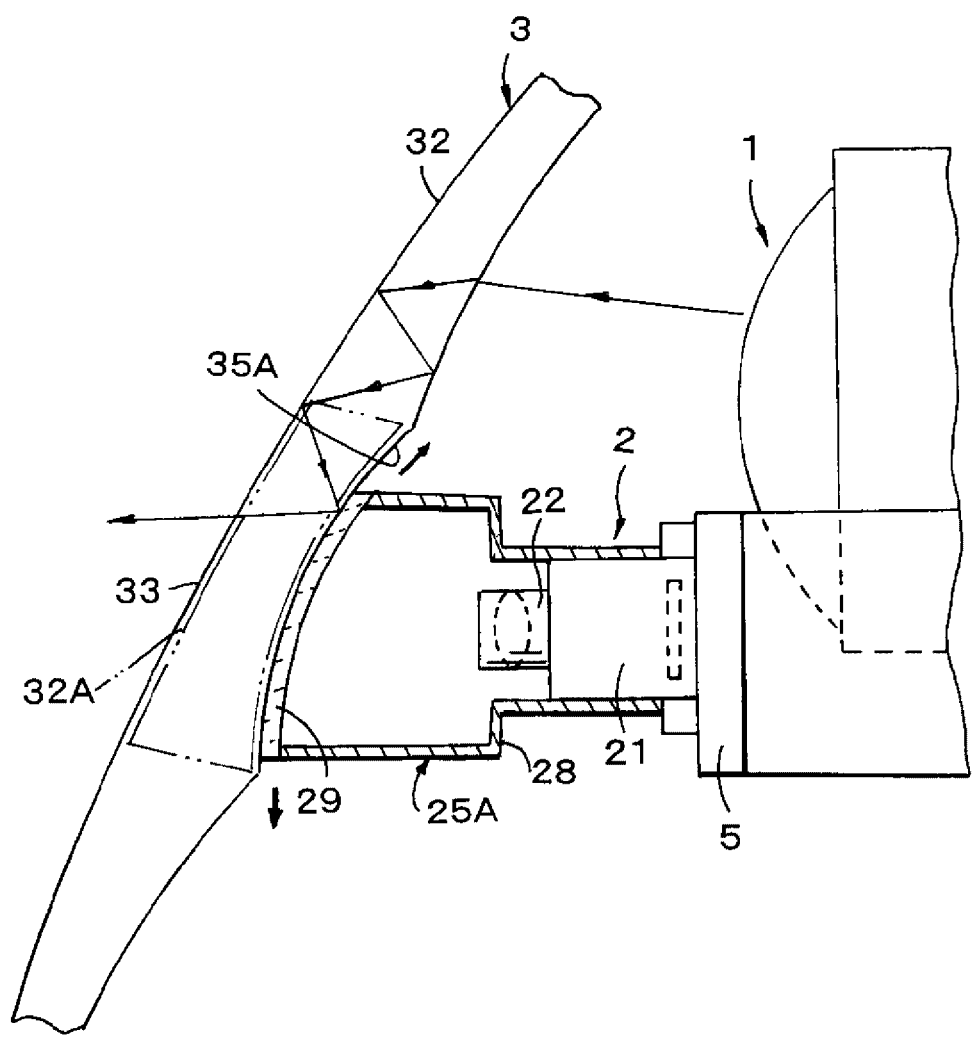
FIG. 7 is a vertical cross-sectional view of a main part of a headlamp according to a third embodiment of the present disclosure.

FIG. 7 is a vertical cross-sectional view of a main part of the headlamp 1 according to the third embodiment. Incidentally, in the description of the third embodiment, description of members having the same reference numerals as those already described in the description of the first embodiment will be omitted for convenience of description. A lens hood 25A is formed in a cylindrical container shape. The lens hood 25A includes a cylindrical portion 28 formed of a light-shielding member and a front cover 29 formed of a transparent member having a translucent property. The lens hood 25A is attached to the camera 2 so as to cover the camera body 21 and the lens barrel 22 of the camera 2.

The front cover 29 is configured as a part of a spherical surface which is convex forward, and the radius of curvature thereof is equal to a radial dimension centered on a tilt center during the aiming adjustment of the camera 2. Further, the front cover 29 is made of a material having a smaller light refractive index than the translucent cover 32.

The translucent cover 32 is formed with a recessed portion 35A in which the rear surface of the imaging region 33 is recessed forward. The recessed portion 35A is formed in a spherical surface having a radius of curvature substantially the same as the radius of curvature of the front cover 29. The front cover 29 and a rear surface of the recessed portion 35A are in contact with each other. In addition, if it can be considered that the front cover 29 and the rear surface of the recessed portion 35 are substantially in contact with each other, they may be arranged close to each other with a minute interval.

In the third embodiment, the direct light emitted from the lamp unit 1 is prevented from being incident on the lens barrel 22 by the cylindrical portion 28 of the lens hood 25A as in the first embodiment. Further, the light incident on the translucent cover 32 and guided inside the translucent cover 32 to the imaging region 33 is emitted forward since the rear surface of the recessed portion 35A is a spherical surface convex forward.

At this time, a part of the light which has travelled to the recessed portion 35A is to be incident on the front cover 29 from the rear surface thereof. The light refractive index of the front cover 29 is smaller than that of the translucent cover 32. Therefore, the light which has travelled to the recessed portion 35A is subjected to critical reflection at an interface where the translucent cover 32 is in contact with the front cover 29, and is prevented from passing through the front cover 29. Accordingly, the part of the light is prevented from being incident on the lens barrel 22, and the occurrence of white out in the camera 2 can be prevented.

The radius of curvature of the front cover 29 is equal to the radius of curvature of the recessed portion 35A. Accordingly, the camera 2 and the lens hood 25A are integrally tilted when the aiming adjustment is performed by operating the aiming screws 41, but the front cover 29 can be moved in an arc direction while being in contact with the rear surface of the recessed portion 35A. Therefore, the camera 2 can be tilted.

In the third embodiment, since the lens hood 25A covers the entire camera 2, it is effective in obtaining a waterproof effect and a heat shielding effect of the camera 2. Further, similar to the first embodiment, the lens hood 25A may be configured to cover the lens barrel 22.

The imaging region 33 of the translucent cover 32 defined by a two-dot chain line in FIG. 7 may be formed of a heterogeneous member 32A having a smaller light refractive index than the other regions. In this case, the front cover 29 of the lens hood 25 is formed of a member having a further smaller light refractive index.

In this way, the light guided through the translucent cover 32 is reflected at an interface with the heterogeneous member 32A and emitted to the outside of the translucent cover 32 from here. Therefore, the light is not guided to the imaging region 33, and the incident of the light on the lens barrel 22 can be prevented. Further, even in a case where a part of the light is guided to the heterogeneous member 32A, the light is reflected at the interface with the front cover 29 in the same manner as described above, so that the incidence of the light on the lens barrel 22 can be prevented.

Incidentally, the light control unit is not limited to the configurations described in the first to third embodiments. Needless to say, appropriate changes can be made as long as the light emitted from the lamp unit which is installed inside the lamp housing is prevented from being incident on an imaging means, while the camera does not interfere with the translucent cover and the tilting thereof is not hindered.

The present disclosure can also be applied to a lamp having a configuration in which the camera is tilted independently of the lamp unit in a lamp housing. Further, the present invention can be applied to a lamp having a configuration in which a plurality of cameras are integrated with the lamp unit, or a plurality of cameras are individually tilted for performing stereo imaging.

In particular, when the lamp unit 1 and the camera 2 are fixed at positions away from the base plate 5, and the aiming mechanism 4 is disposed at a position close to the lamp unit 1, a tilt radius of the camera 2 is increased, and a tilt range of the camera 2 becomes larger. In such a case, the camera 2 is preferably configured to be tilted independently. That is, an aiming mechanism dedicated to the camera 2 is provided.

When the configuration in which the camera is independently tilted is adopted as described above, a screw pitch (thread pitch) between the aiming screw for the lamp unit 1 and the aiming screw for the camera 2 are appropriately adjusted, whereby it is possible to tilt the lamp unit 1 and the camera 2 by the same angle when both of the aiming screws are rotated by the same amount.

Alternatively, a tool for axially rotating the aiming screws for the lamp unit and the camera simultaneously may be designed, and in this case, the aiming screws are configured to be axially rotated at different rotation speeds. That is, when the aiming screws for the lamp unit and the camera are axially rotated, the lamp unit and the camera may be tilted in synchronization with each other.

Fourth Embodiment

Figure 8:
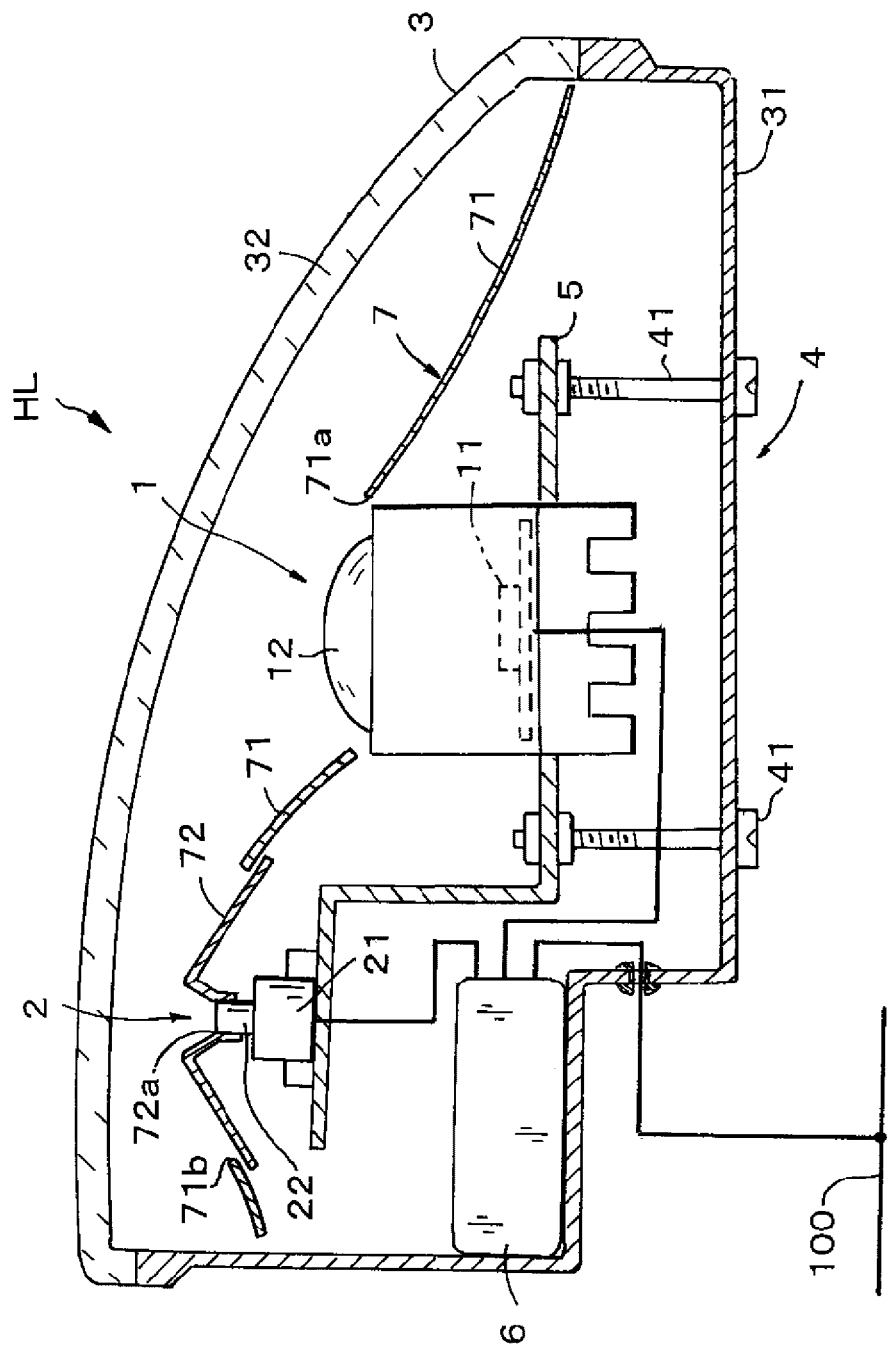
FIG. 8 is a horizontal cross-sectional view of a headlamp according to a fourth embodiment of the present disclosure.

Next, fourth to sixth embodiments of the present disclosure will be described with reference to the drawings. Incidentally, description of members having the same reference numerals as those already described in the description of the first embodiment will be omitted for convenience of description. First, the fourth embodiment will be described. FIG. 8 is a horizontal cross-sectional view of the right headlamp HL according to the fourth embodiment.

The right headlamp HL includes the lamp unit 1 capable of performing the ADB control and the camera 2. The camera 2 is an example of the imaging device. The lamp unit 1 and the camera 2 are disposed in the lamp housing 3. In the present embodiment, the lamp unit 1 is disposed at the outer position in the vehicle width direction in the lamp housing 3, and the camera 2 is disposed on the inner side thereof.

The lamp housing 3 includes the lamp body 31 having the container shape in which the front surface region is opened, and the translucent cover 32 fixed so as to cover the opening of the lamp body 31. The light emitted from the lamp unit 1 passes through the translucent cover 32 and is radiated onto the front region of the automobile. Further, the camera 2 is configured to be capable of imaging the front region of the automobile through the translucent cover 32.

The base plate 5 supported by the aiming mechanism 4 by the lamp body 31 is disposed in the lamp housing 3. The lamp unit 1 and the camera 2 are supported by the base plate 5. The aiming mechanism 4 includes the aiming screws 41. By manually or automatically adjusting the aiming screws 41, the base plate 5 is tilted in the upper-lower direction and the left-right direction. By tilting the base plate 5 up and down, it is possible to adjust the angles of the optical axes of the lamp unit 1 and the camera 2. Since the aiming mechanism 4 including such aiming screws 41 is known, a detailed description thereof will be omitted.

Although not described in detail, the lamp unit 1 is configured as the projector-type lamp unit including the plurality of light emitting diodes (LEDs) 11 and the projection lens 12. The light emitted by the LEDs 11 is projected to the front of the automobile by the projection lens 12 to illuminate the front of the automobile. The lamp unit 1 is configured to form an arbitrary light distribution pattern including a high beam light distribution and a low beam light distribution and to be capable of performing the ADB light distribution control by selecting the plurality of LEDs 11 and causing the plurality of LEDs 11 to emit light so as to control light distribution thereof.

In the present embodiment, the camera 2 is constituted by a digital camera, and the lens barrel 22 is integrally provided on the front surface of the camera body 21. The camera 2 is capable of capturing, through the translucent cover 32, an image of the front region of the automobile, particularly a vehicle such as a preceding vehicle or an oncoming vehicle present in the front region.

The lamp electronic control unit (ECU) 6 connected to the controller region network (CAN) 100 is disposed in the lamp housing 3. The lamp ECU 6 is electrically connected to the lamp unit 1 and the camera 2. The lamp ECU 6 performs the ADB light distribution control by controlling the lighting state of the lamp unit 1, that is, the light emission of the LEDs 11, based on an image obtained by imaging by the camera 2.

Further, an extension 7 functioning as a pseudo reflector is installed in the lamp housing 3. The extension 7 has a light reflecting surface formed by vapor-depositing aluminum on a surface thereof, and includes a fixed extension 71 and a movable extension 72 in the fourth embodiment.

The fixed extension 71 is disposed substantially over an entire region along the inner surface of the translucent cover 32 in the lamp housing 3, and covers the lamp unit 1, the camera 2, the base plate 5, the lamp ECU 6, and the like, and prevents the lamp unit 1, the camera 2, the base plate 5, the lamp ECU 6, and the like from being exposed to the outside through the translucent cover 32. In the fixed extension 71, a lamp window 71a is opened in a region corresponding to the lamp unit 1. The light emitted from the lamp unit 1 is emitted forward of the headlamp HL through the lamp window 71a. Further, a camera window 71b is opened in a region corresponding to the camera 2, and imaging can be performed by the camera 2 through the camera window 71b.

Figure 9:
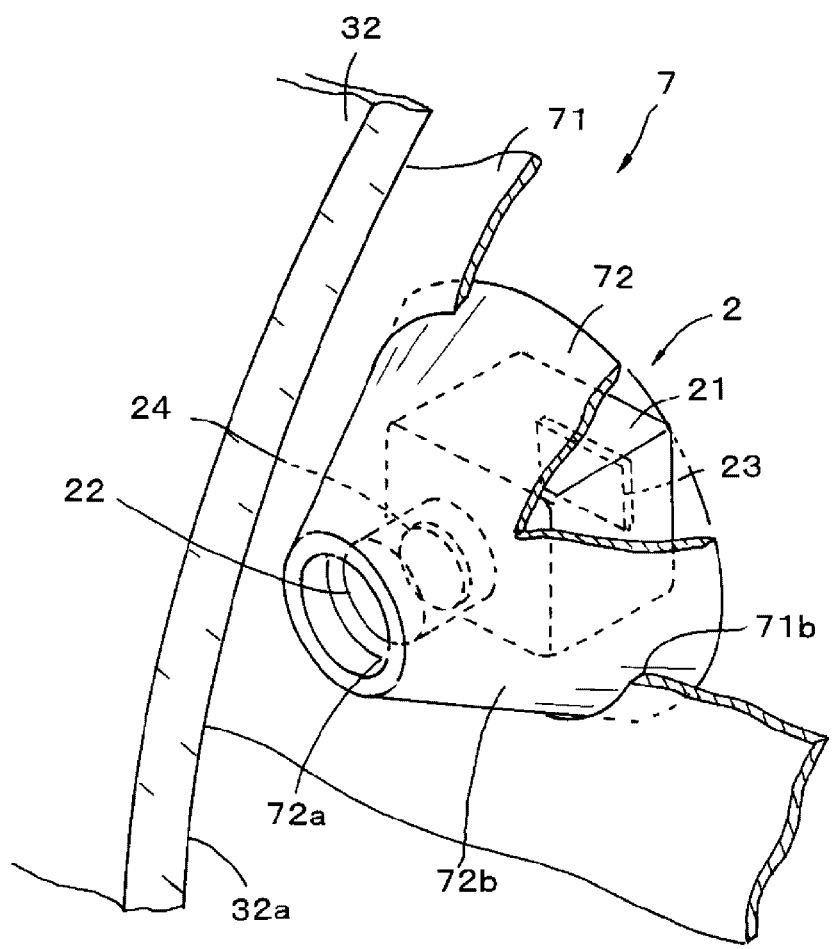
FIG. 9 is a perspective view in which a part of the camera vicinity region is broken.
Figure 10A:
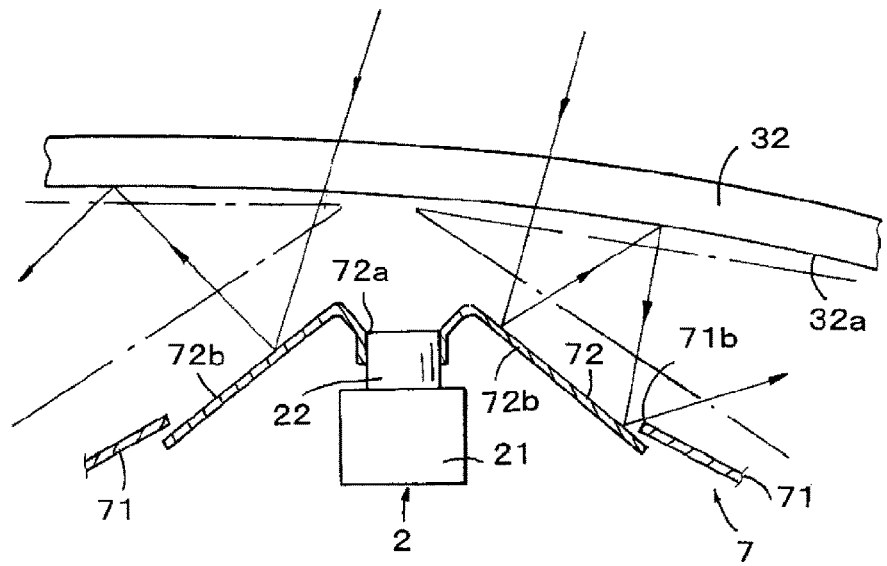
FIG. 10A is an enlarged horizontal cross-sectional view of the camera vicinity region.
Figure 10B:
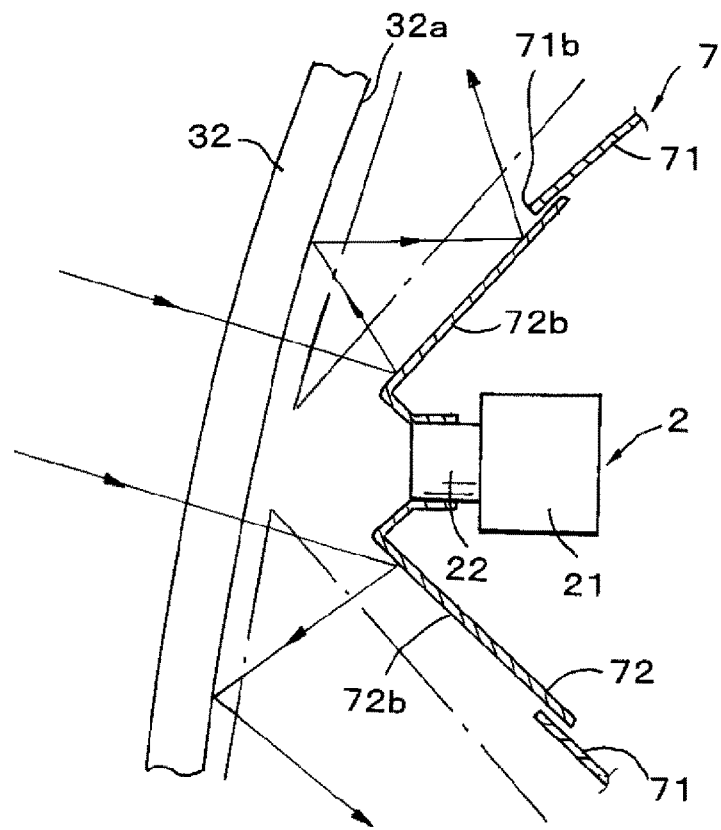
FIG. 10B is an enlarged vertical cross-sectional view of the camera vicinity region.

FIGS. 9, 10A, and 10B are diagrams for illustrating details of the movable extension 72. FIG. 9 is a perspective view of a part of a portion including the camera 2. FIGS. 10A and 10B are horizontal and vertical enlarged cross-sectional views of a camera vicinity region thereof. The camera 2 is disposed on a rear side of the camera window 71b provided in the fixed extension 71, and the movable extension 72 is attached to the camera 2.

The camera 2 includes the camera body 21 and the lens barrel 22. The imaging element 23 including the CCD or the CMOS is installed in the camera body 21. An imaging lens 24 is installed in the lens barrel 22. It is possible to perform imaging by forming an image of a vehicle to be imaged on the imaging element 23 by the imaging lens 24. Incidentally, in the fourth embodiment, although the camera 2 includes the lens barrel 22, the lens barrel 22 is read as an imaging lens in a case of a camera in which the imaging lens 24 is installed in the camera body 21.

The movable extension 72 is formed in a circular conical umbrella shape. An inner edge portion of a lens hole 72a provided at a top portion of the movable extension 72 is attached to a tip end portion of the lens barrel 22, and the movable extension 72 is disposed so as to cover substantially the entire lens barrel 22 or the camera 2. Most part of the movable extension 72 including the top portion thereof is inserted through the camera window 71b and protrudes from a rear surface side to a front surface side of the fixed extension 71. The lens hole 72a is an example of the imaging window.

The camera window 71b is configured as a circular hole having a diameter somewhat larger than an outer diameter of the lens barrel 22. Further, the camera window 71b is formed to have a diameter somewhat smaller than a bottom diameter of the movable extension 72. An outer peripheral side surface 72b of the movable extension 72 is in contact with an inner edge portion of the camera window 71b, or is disposed apart from the inner edge portion of the camera window 71b with an extremely small dimension so as to close the camera window 71b. Although the movable extension 72 is tilted together with the camera 2 at the time of aiming adjustment, the movable extension 72 is held in a state of closing the camera window 71b even when being tilted.

As described above, the outer peripheral side surface 72b of the movable extension 72 is disposed to face an inner surface 32a of the translucent cover 32. A gap formed between the outer peripheral side surface 72b and the inner surface 32a is the smallest at a portion facing the lens barrel 22, and gradually increases in a direction away from the camera 2 from this portion, in other words, in an outer diameter direction of the movable extension 72 having the circular conical umbrella shape. That is, as indicated by dash-dotted lines in FIGS. 10A and 10B, the gap between the outer peripheral side surface 72b of the movable extension 72 and the inner surface 32a of the translucent cover 32 is formed in a tapered cross-sectional shape in the horizontal cross section and the vertical cross section. The outer peripheral side surface 72b is an example of the surface region.

According to the fourth embodiment, although illustration of the light beam is omitted in FIG. 8, the light emitted from the lamp unit 1 passes through the translucent cover 32 and is radiated onto the front region with a required light distribution, and illumination by the ADB control is performed. A part of the light emitted from the lamp unit 1 is directed to the camera 2 directly or after being reflected by the translucent cover 32. Since the light is directed from a lateral side with respect to the lens barrel 22 of the camera 2, the light is shielded by the fixed extension 71 and the movable extension 72 covering the lateral side of the lens barrel 22 and is prevented from being incident on the lens barrel 22. Further, although the other part of the light is guided inside the translucent cover 32 and emitted toward the camera 2, since the light is also directed from a lateral side with respect to the lens barrel 22, the light is shielded by the movable extension 72 and prevented from being incident on the lens barrel 22.

On the other hand, as indicated by arrow lines in FIGS. 10A and 10B, light emitted from headlamps of an oncoming vehicle (not illustrated) passes through the translucent cover 32 and is incident on the lamp housing 3 from a front direction of the lens barrel 22 or a direction close thereto. When the headlamps of the oncoming vehicle are in the high beam light distribution, since the amount of the emitted light thereof is extremely large and the emitted light is incident at an angle along an optical axis of the lens barrel 22, the emitted light is likely to be directly incident on the lens barrel 22 as it is, and it is difficult to prevent this. Therefore, since the image imaged due to halation in the camera 2 is in a whiteout state in this situation, the lamp ECU 6 stops the ADB control in the lamp unit 1 when detecting such an image.

Since the amount of the emitted light when the headlamps of the oncoming vehicle are in the low beam light distribution is smaller than that when the headlamps are in the high beam light distribution, and the emitted light is incident from a front left direction at an angle downward from the horizontal direction, the light incident after passing through the translucent cover 32 is rarely directly incident on the lens barrel 22. Although a part of the light from the oncoming vehicle is incident on the lens barrel 22 from a direction along the optical axis thereof, since the amount of the light of the low beam light distribution is smaller than that of the light of the high beam light distribution, and the light is imaged on the imaging element 23 by the imaging lens 24, white out rarely occurs even if the light is imaged by the camera 2.

However, of the light incident into the lamp housing 3 from the outside, the light incident on the fixed extension 71 or the movable extension 72 is reflected by the surfaces of the extensions 71, 72, and then is incident on the inner surface 32a of the translucent cover 32 and is reflected again. By repeating this, some of the light may be incident on the lens barrel 22 from a random direction.

In this case, since the fixed extension 71 is further away from the camera 2 than the movable extension 72, the light reflected between the fixed extension 71 and the translucent cover 32 is rarely incident on the lens barrel 22. Further, even if the light is incident on the lens barrel 22, the amount of light reaching the lens barrel 22 is small due to attenuation by repeated reflection between the fixed extension 71 and the translucent cover 32. Accordingly, there is almost no possibility that white out occurs in the camera 2 due to these lights.

On the other hand, since the light reflected between the movable extension 72 and the translucent cover 32 in the vicinity region of the camera 2 is reflected at a position close to the camera 2, a part of the reflected light is incident on the lens barrel 22 from a random direction in a state where the amount of light is relatively large, and white out may occur in the camera 2. However, since the outer peripheral side surface 72b of the movable extension 72 in the fourth embodiment is formed into a circular conical surface, the light incident into the lamp housing 3 is reflected in the outer diameter direction of the movable extension 72, that is, in the direction away from the camera 2, as illustrated by the arrow lines in FIGS. 10A and 10B. When the reflected light is reflected by the inner surface 32a of the translucent cover 32, the reflected light is reflected in a direction further away from the camera 2.

Since the reflection is centered on the top portion of the movable extension and performed in the entire peripheral region including the upper, lower, left, and right thereof, the light reflected by the movable extension 72 is reflected toward the direction away from the camera 2 and is prevented from being incident on the lens barrel 22. In particular, since the gap between the outer peripheral side surface 72b of the movable extension 72 and the inner surface 32a of the translucent cover 32 has the tapered cross-sectional shape, the direction of the light reflected by the outer peripheral side surface 72b and the inner surface 32a is gradually directed in the left-right direction, and is not incident on the lens barrel 22. Accordingly, the white out phenomenon in the camera 2 can be reliably prevented.

A part of the light reflected by the movable extension 72 and projected onto the inner surface 32a of the translucent cover 32 may be incident into the translucent cover 32 and guided inside, but the direction of the incident light is directed away from the camera 2 and is not guided to the camera 2. Therefore, the guided light is not incident on the lens barrel 22 even if the light is emitted from the translucent cover 32.

Thus, in the fourth embodiment, in order to cause the fixed extension 71 and the movable extension 72 to function as pseudo reflectors, the light from the oncoming vehicle can be prevented from being incident on the lens barrel 22 even if an aluminum film is formed on each surface to configure the entire surface as the light reflecting surface. Therefore, unlike Patent Literature 2, the good appearance is not degraded due to the provision of the reflected light reducing portion in a part of the extension, and design in the appearance through the translucent cover 32 is enhanced.

In a case where the base plate 5 is tilted by the aiming mechanism 4 and the camera 2 is tilted, the movable extension 72 attached to the lens barrel 22 is tilted together with the camera 2 in the camera window 71b of the fixed extension 71. Since the gap between the outer peripheral side surface 72b of the movable extension 72 and the inner surface 32a of the translucent cover 32 is maintained even when the movable extension 72 is tilted in this manner, the light of the oncoming vehicle can be prevented from being incident on the lens barrel 22.

Fifth Embodiment

Figure 11A:
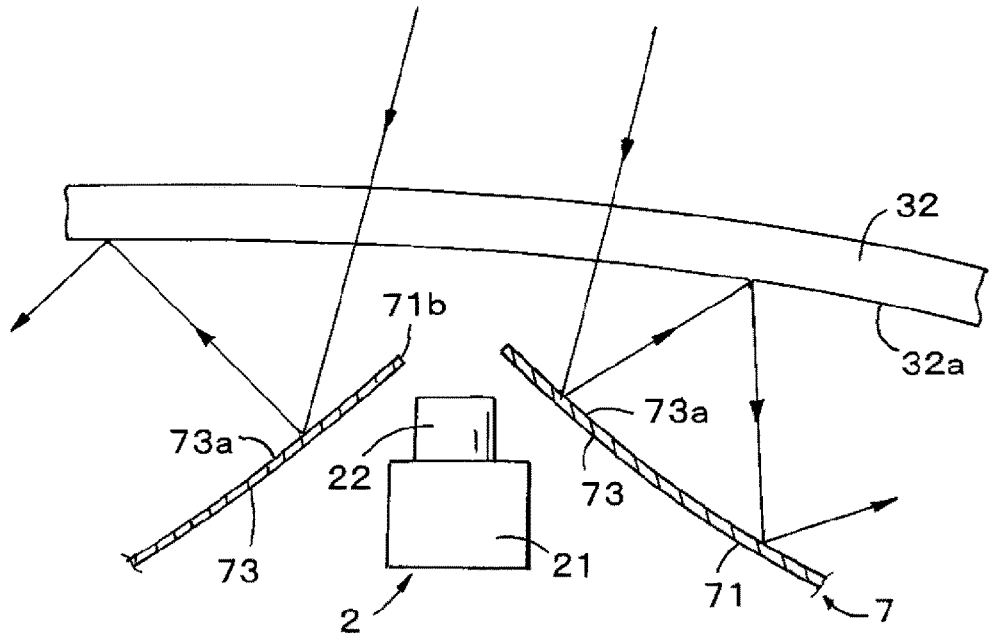
FIG. 11A is a horizontal cross-sectional view of a camera vicinity region of a headlamp according to a fifth embodiment of the present disclosure.
Figure 11B:
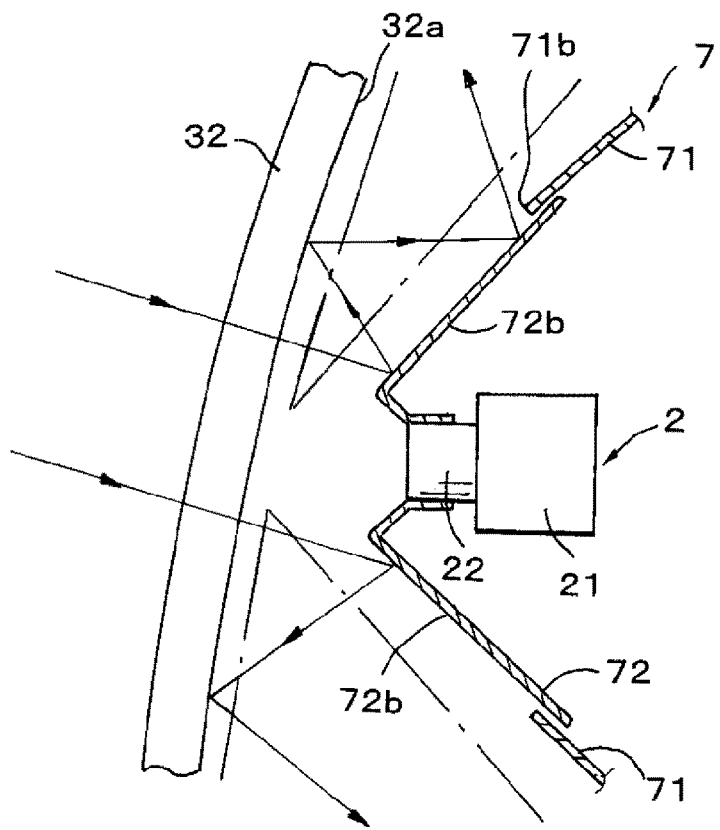
FIG. 11B is a vertical cross-sectional view of the camera vicinity region.

FIGS. 11A and 11B are horizontal and vertical cross-sectional views of a camera vicinity region of a headlamp according to the fifth embodiment, and are views corresponding to FIGS. 10A and 10B in the fourth embodiment. Similar to the fourth embodiment, the extension 7 of the fifth embodiment includes the fixed extension 71. A region of the camera window 71b which is a part of the fixed extension 71 is opened, that is, a partial region centered on the camera window 71b, is configured as an extension 73 (hereinafter, referred to as a circular conical extension) formed in a circular conical shape convex forward toward the translucent cover 32. The camera 2 is disposed inside the circular conical extension 73. An outer peripheral side surface 73a of the circular conical extension 73 is an example of the surface region. As in the fourth embodiment, a gap between the outer peripheral side surface 73a and the inner surface 32a of the translucent cover 32 in the horizontal and vertical cross sections is formed in the tapered cross-sectional shape centered on the lens barrel 22 of the camera 2. The camera window 71b is an example of the imaging window.

In the fifth embodiment, as illustrated by arrow lines in FIGS. 11A and 11B, when light of the low beam light distribution of the headlamps of the oncoming vehicle passes through the translucent cover 32 and is incident into the lamp housing 3, reflection is repeated between the outer peripheral side surface 73a of the circular conical extension 73 and the inner surface 32a of the translucent cover 32. Then, the reflected light in each reflection is directed in an outer diameter direction of the circular conical extension 73, that is, in a direction away from the camera 2, and the incidence of the light on the lens barrel 22 can be prevented.

Since the camera window 71b is formed to have a diameter somewhat larger that of than the lens barrel 22, when the camera 2 is tilted by the aiming adjustment, the lens barrel 22 does not interfere with the circular conical extension 73, and the camera 2 can be tilted. In this case, if the front end portion of the lens barrel 22 moves backward by a smaller dimension than the inner edge of the camera window 71b as illustrated in FIGS. 11A and 11B, the effect of preventing the light passing through the translucent cover 32 from being directly incident on the lens barrel 22 is promoted.

Sixth Embodiment

Figure 12A:
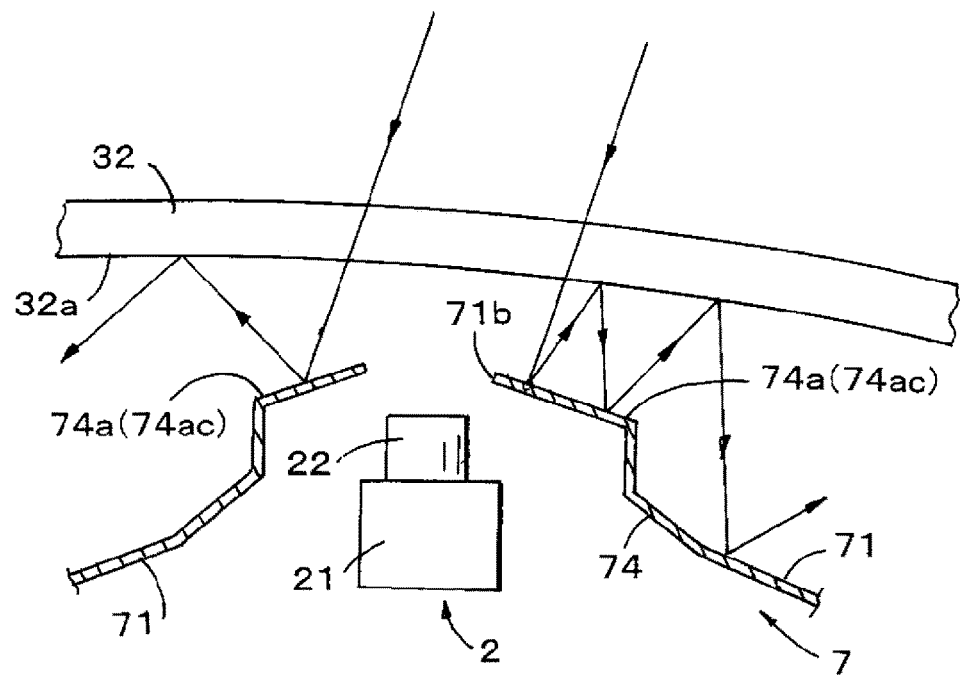
FIG. 12A is a horizontal cross-sectional view of a camera vicinity region of a headlamp according to a sixth embodiment of the present disclosure.
Figure 12B:
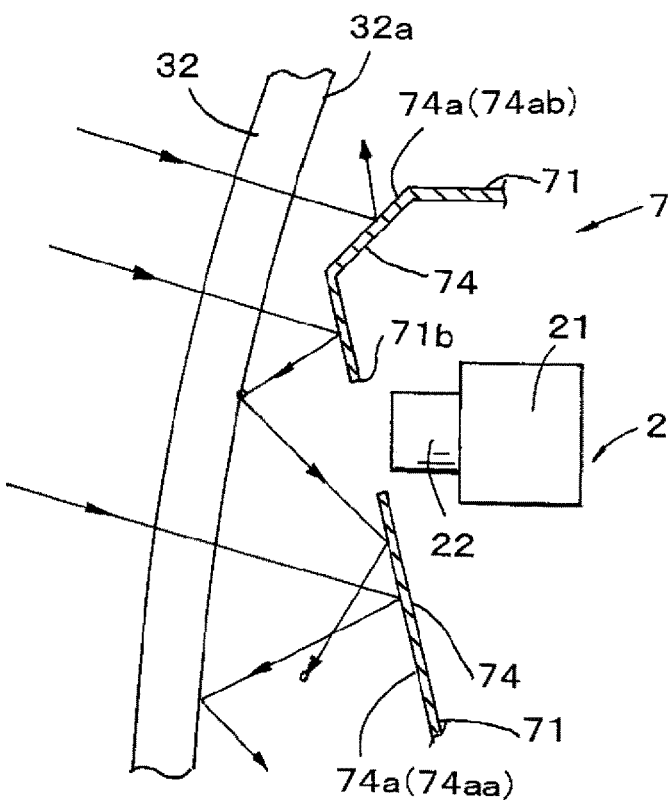
FIG. 12B is a vertical cross-sectional view of the camera vicinity region.

FIGS. 12A and 12B are horizontal and vertical cross-sectional views of a camera vicinity region of a headlamp according to the sixth embodiment, and are views similar to FIGS. 11A and 11B in the fifth embodiment. Similar to the fifth embodiment, the extension 7 of the sixth embodiment includes the fixed extension 71. A region of the fixed extension 71 where the camera window 71b is opened is configured as an extension 74 (hereinafter, referred to as a roof-type extension) which is convex forward and has a front surface 74a formed into a roof type in each of the horizontal direction and the vertical direction. Particularly in the vertical direction, the roof-type extension 74 is configured as a tilt surface in which a lower region 74aa of the camera window 71b of the front surface 74a has a larger area than an upper region 74ab and gradually moves backward toward the lower side. The camera 2 is disposed inside the roof-type extension 74. The camera window 71b is an example of the imaging window.

In the sixth embodiment, in the lower region 74aa of the front surface 74a of the roof-type extension 74, a gap with the inner surface 32a of the translucent cover 32 is formed in a tapered cross-sectional shape which gradually increases from the upper side toward the lower side. In the horizontal direction, since the front surface 74a is formed in the roof type, the gap with the inner surface 32a of the translucent cover 32 is formed in the tapered cross-sectional shape toward the left and right in the horizontal direction as in the fourth and fifth embodiments. The front surface 74a is an example of the surface region.

In the sixth embodiment, as illustrated by arrow lines in FIGS. 12A and 12B, when light of the low beam light distribution of the headlamps of the oncoming vehicle is incident after passing through the translucent cover, the light incident on the lower region of the camera 2 is directed downward in the direction away from the camera 2 by repeated reflection between the lower region 74aa of the front surface 74a of the roof-type extension 74 and the inner surface 32a of the translucent cover 32, and thus the incidence of the light on the lens barrel 22 can be prevented.

The light incident on left and right regions 74ac or the upper region 74ab of the front surface 74a of the roof-type extension 74 is directed in the left-right direction or the upper direction away from the camera 2 by repeated reflection between each of these regions and the inner surface 32a of the translucent cover 32, thereby preventing the incidence of the light on the lens barrel 22.

In the sixth embodiment, the front surface 74a of the roof-type extension 74 may be configured as a tilt flat surface which simply moves obliquely backward toward the lower side. That is, the front surface 74a may be configured as the roof-type extension having a saw-tooth shape when viewed from a lateral side. In this case, the light incident into the lamp housing from the outside is reflected downward of the camera 2 and is not incident on the lens barrel 22.

In the sixth embodiment, the camera window 71b is formed to have a diameter somewhat larger than that of the lens barrel 22 of the camera 2. Therefore, when the camera 2 is tilted in the aiming adjustment, the lens barrel 22 and the roof-type extension 74 do not interfere with each other, and the camera 2 can be tilted as in the fifth embodiment. In this case, if the front end portion of the lens barrel 22 moves backward by a smaller dimension than the inner edge of the camera window 71b, the effect of preventing the light passing through the translucent cover 32 from being directly incident on the lens barrel 22 is promoted.

Here, in any of the fourth to sixth embodiments, the translucent cover 32 may be subjected to anti-reflection treatment or reflection suppressing treatment. By applying the anti-reflection treatment and the reflection suppressing treatment to the translucent cover 32, it is possible to prevent or suppress the light reflected by the extension 7 from being reflected by the translucent cover 32, and to more reliably prevent the light from being incident on the lens barrel 22.

Figure 13A:
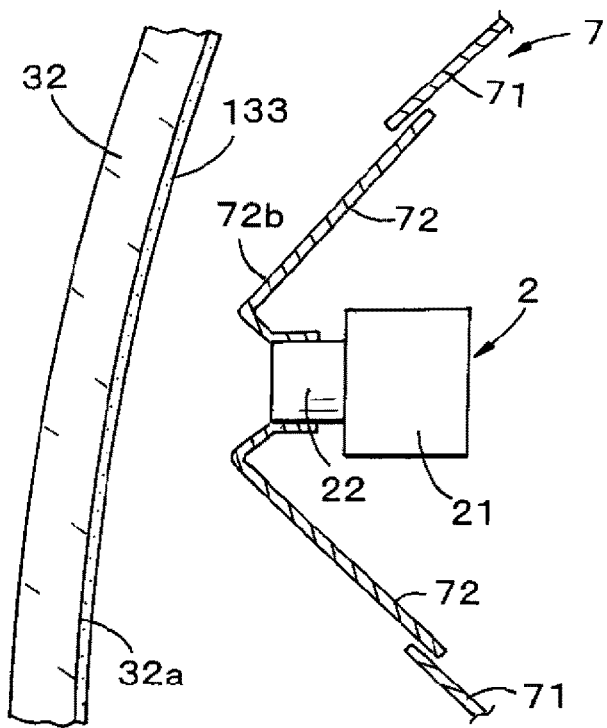
FIG. 13A is cross-sectional view illustrating anti-reflection treatment.

For example, as illustrated in the example applied to the fourth embodiment in FIG. 13A, the anti-reflection treatment is applied to a region wider than an imaging region of the camera 2 of the translucent cover 32, that is, a region of an angle of view of imaging. Here, although an anti-reflection sheet 133 is attached to the inner surface 32a of the region of the translucent cover 32, an anti-reflection agent may be applied. Accordingly, light reflection on the inner surface 32a of the translucent cover 32 that affects imaging of the camera 2 can be prevented, and the incidence of the light on the lens barrel 22 can be more effectively prevented.

Figure 13B:
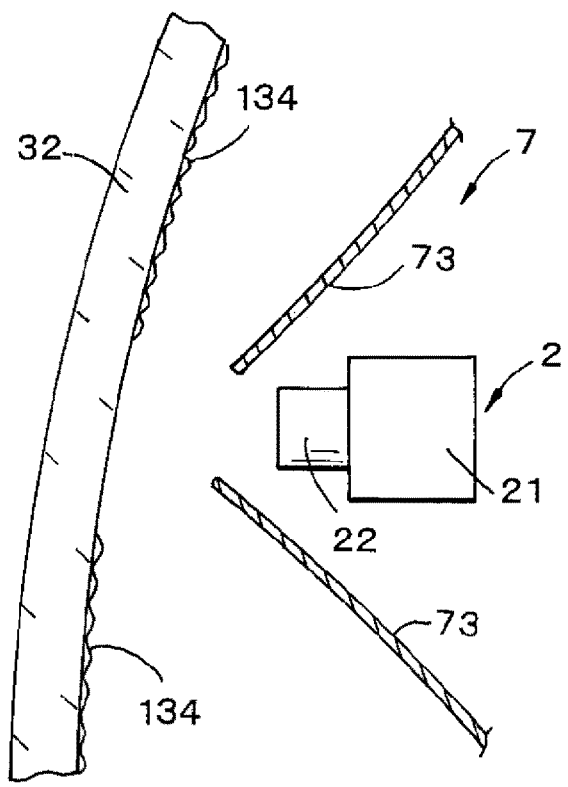
FIG. 13B is cross-sectional view illustrating reflection suppressing treatment.

Alternatively, as illustrated in the example applied to the fifth embodiment in FIG. 13B, the reflection suppressing treatment is applied to a region other than the imaging region of the camera 2 of the translucent cover 32. Here, fine unevenness, embossing places 134, and the like are formed on the region of the inner surface 32a of the translucent cover 32. Accordingly, light reflection on the inner surface 32a of the translucent cover 32 that does not affect imaging of the camera 2 is suppressed, and the incidence of the light on the lens barrel 22 can be more effectively prevented.

Since the anti-reflection treatment or the reflection suppressing treatment on the translucent cover 32 is not applied to the extension 7, the good appearance of the extension 7 observed through the translucent cover 32, particularly the good appearance of the entire surface of the extension 7 having the appearance of the pseudo reflector is not impaired. Accordingly, the good appearance of the headlamp is not affected, and the design is improved.

Although not illustrated in the drawings, due to the difference in the shape and configuration of the headlamp, a part of the extension 7 installed in the lamp housing may be provided with a portion which is not exposed to the outside through the translucent cover 32. In a case where such an unexposed portion is present in the vicinity of the camera, the surface of the portion may be subjected to the anti-reflection treatment or the reflection suppressing treatment. In this way, the reflection of light at this portion is reduced without degrading the good appearance of the lamp, and the effect of preventing the incidence of the light on the lens barrel is enhanced.

Incidentally, in the fourth to sixth embodiments, examples of the movable extension, the circular conical extension, and the roof-type extension are illustrated as the form of the surface region, but the present invention is not limited thereto. In a case where the shape of the lamp housing of the headlamp, particularly the shape of the translucent cover, is different, the shape of the extension may be changed correspondingly. That is, if the light incident on the vicinity region of the camera after passing through the translucent cover is reflected toward the direction away from the camera, and the reflected light is reflected on the inner surface of the translucent cover toward a direction further away from the camera, the shape of the lamp housing is not limited to the shape in the fourth to sixth embodiments.

Usually, when the headlamps of the oncoming vehicle are in the low beam light distribution, since the light emitted from the headlamps is incident in the lower direction with respect to the camera, the gap between the extension and the tapered cross-sectional shape formed of the translucent cover is preferably disposed in the vertical direction of the camera. In other words, the surface region only needs to be disposed at least in an upper-lower region of the camera, and operational effects of the present disclosure can be achieved with this configuration alone.

As can be seen from the fourth to sixth embodiments, the tapered cross-sectional shape of the gap formed by the extension and the translucent cover is not limited to the flat surface where the taper is formed. That is, the shape may be a tapered cross-sectional shape of a gap formed by a curved surface and a flat surface or a curved surface and a curved surface. Accordingly, the surface region of the extension may be a curved surface or a flat surface, or a combination thereof. For example, the circular conical surface in the fourth and fifth embodiments may be formed in a spherical surface or a surface shape close to the spherical surface.

Although the light reflection on the inner surface of the translucent cover has been described in the fourth to sixth embodiments, the light may also be reflected on the outer surface of the translucent cover and directed to the camera. According to the present disclosure, the effect of preventing whiteout can be obtained even for the light reflected on the outer surface.

The present disclosure can also be applied to a lamp in which a camera is fixedly disposed in a lamp housing. In this case, the movable extension in the fourth embodiment may be formed integrally with the fixed extension. Further, the circular conical extension in the fifth embodiment and an inverted trapezoidal extension in the third embodiment may be integrally attached to the lens barrel of the camera.

The present disclosure can also be applied to a lamp having a configuration in which the camera is tilted independently of the lamp unit in the lamp housing. Further, the present invention can be applied to a lamp having a configuration in which a plurality of cameras are integrated with the lamp unit, or a plurality of cameras are individually tilted for performing stereo imaging.

This application is based on Japanese Patent Application 2018-088085 filed on May 1, 2018, and Japanese Patent Application 2018-088086 filed on May 1, 2018, contents of which are incorporated herein by reference.

The invention claimed is:

1. A vehicle lamp comprising:
 a lamp unit disposed in a lamp housing including a translucent cover;
 an imaging device disposed in the lamp housing and configured to be tiltable; and
 a light control unit provided on at least one of the translucent cover and the imaging device, and configured to prevent light emitted from the lamp unit from being incident on the imaging device,
 wherein the light control unit is configured to allow the imaging device to tilt.

2. The vehicle lamp according to claim 1,
 wherein the light control unit is a light-shielding lens hood provided at the imaging device, and
 wherein the lens hood is configured not to interfere with the translucent cover when the imaging device is tilted.

3. The vehicle lamp according to claim 2, wherein the light control unit includes a fixed cover provided on the translucent cover and overlapping the lens hood, and ensures a gap between the fixed cover and the lens hood to allow the imaging device to tilt.

4. The vehicle lamp according to claim 1, wherein the light control unit is a flexible light-shielding lens hood provided at the imaging device.

5. The vehicle lamp according to claim 1,
 wherein the light control unit is a light emitting portion provided at a peripheral portion of an imaging region of the translucent cover facing the imaging device, and configured to emit light which is guided through the translucent cover toward an outer side of the imaging region, and
 wherein the imaging device is disposed on an inner side of the light emitting portion in a state where a gap which allows the imaging device to tilt with respect to the peripheral portion is ensured.

6. The vehicle lamp according to claim 1,
 wherein the light control unit is a lens hood provided at the imaging device and the lens hood includes a light-shielding cylindrical portion and a translucent front cover, and
 wherein the front cover is in contact with the translucent cover in a relatively movable manner.

7. The vehicle lamp according to claim 6, wherein the front cover is made of a material having a smaller light refractive index than the translucent cover.

8. The vehicle lamp according to claim 1, further comprising:
 an aiming adjustment mechanism configured to integrally support the lamp unit and the imaging device.

9. A vehicle lamp comprising:
 an imaging device disposed in a lamp housing which includes a translucent cover and configured to perform imaging through the translucent cover; and
 an extension disposed in the lamp housing, configured to cover the imaging device, and having a surface facing an inner surface of the translucent cover configured as a light reflecting surface,
 wherein the extension includes, in a partial region of the light reflecting surface, a surface region forming a gap having a cross-sectional shape a dimension of which between the light reflecting surface and the inner surface of the translucent cover gradually increases as being away from the imaging device in at least one of a horizontal cross section and a vertical cross section.

10. The vehicle lamp according to claim 9, wherein the surface region is disposed in a vertical direction of the imaging device.

11. The vehicle lamp according to claim 9,
 wherein the imaging device is configured to be tiltable with respect to the lamp housing,
 wherein the extension includes a fixed extension supported by the lamp housing and a movable extension supported by the imaging device,
 wherein the movable extension includes an imaging window through which the imaging device can perform imaging, and
 wherein the movable extension is formed as a conical surface centered on the imaging window, and the conical surface is configured as the surface region.

12. The vehicle lamp according to claim 9,
 wherein the extension is a fixed extension supported by the lamp housing,
 wherein the fixed extension includes an imaging window through which the imaging device can perform imaging, and
 wherein a part of the fixed extension is formed as a conical surface centered on the imaging window, and the conical surface is configured as the surface region.

13. The vehicle lamp according to claim 11, wherein the conical surface is formed of a circular conical surface.

14. The vehicle lamp according to claim 9,
 wherein the extension is a fixed extension supported by the lamp housing, wherein the fixed extension includes an imaging window through which the imaging device can perform imaging, and wherein a part of the fixed extension is formed as a tilt surface which is tilted in at least one direction from the imaging window, and the tilting surface is configured as the surface region.

15. The vehicle lamp according to claim 14, wherein the tilt surface is tilted downward of the lamp housing.

16. The vehicle lamp according to claim 9, wherein a part of the inner surface of the translucent cover is subjected to anti-reflection treatment or anti-reflection treatment.

* * * * *